Dec. 18, 1951    J. W. MAYER ET AL    2,578,719
INJECTION MOLDING APPARATUS
Filed June 14, 1944    4 Sheets-Sheet 1
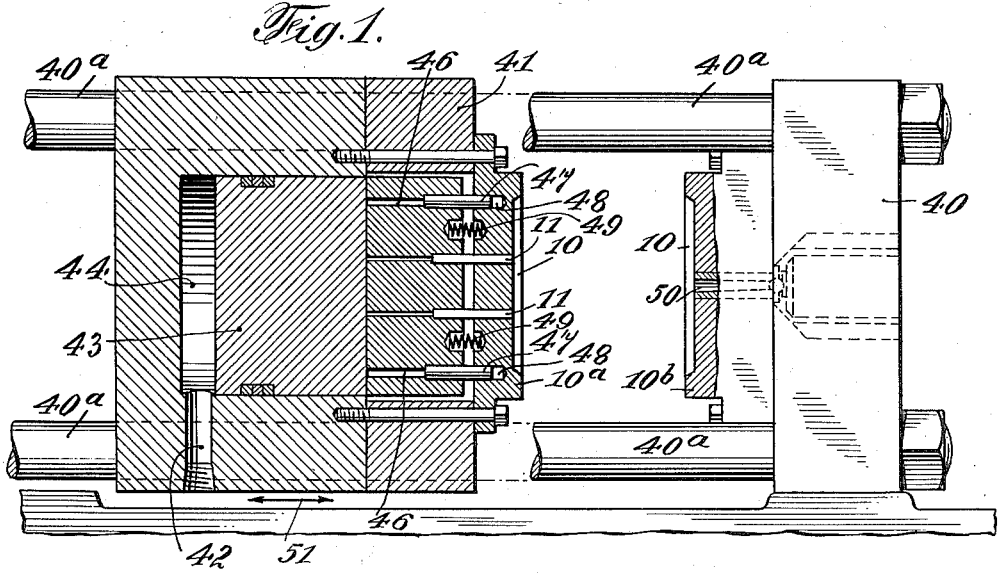
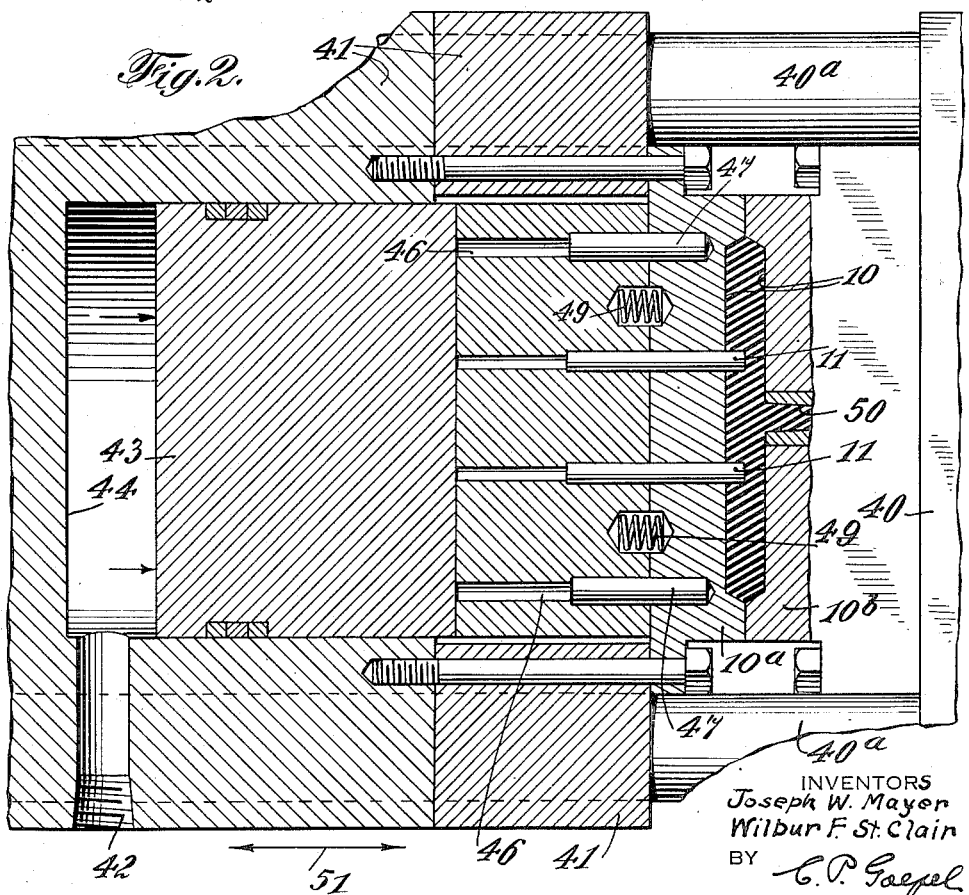
INVENTORS
Joseph W. Mayer
Wilbur F. St. Clair
BY
C. P. Goepel
ATTORNEY

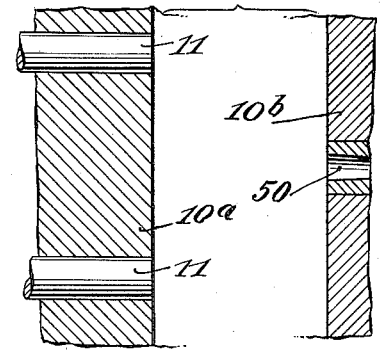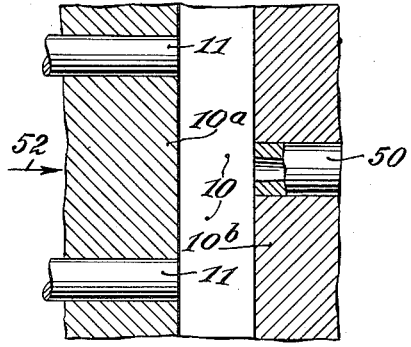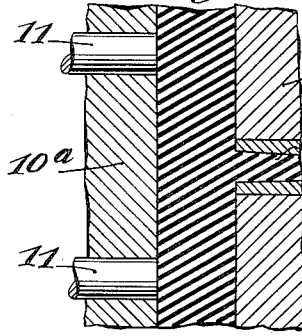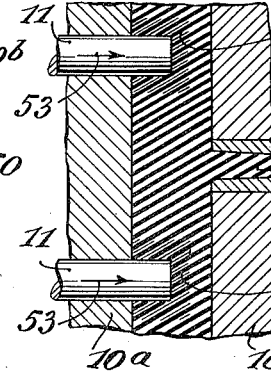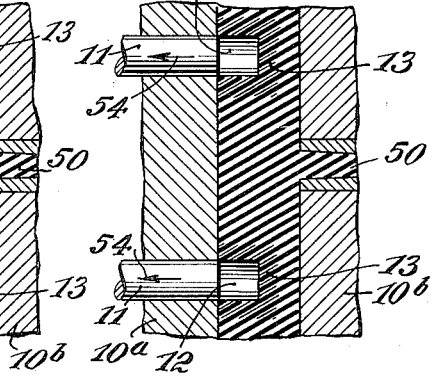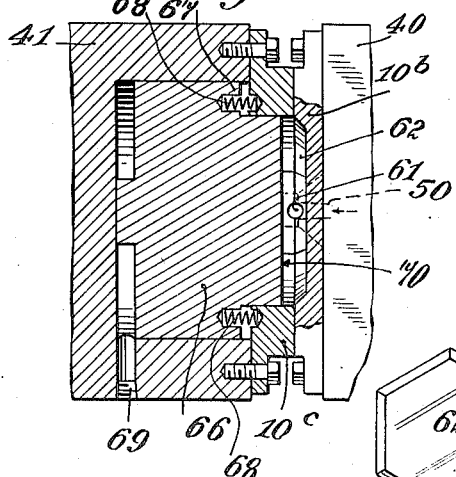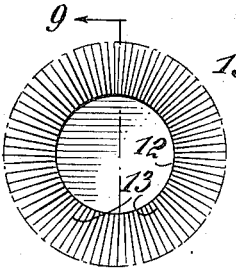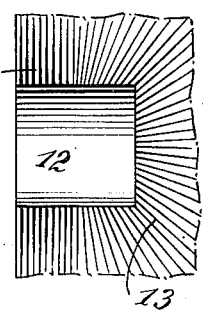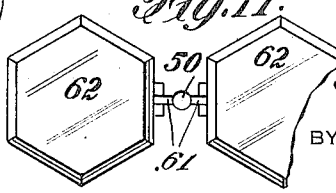

Dec. 18, 1951     J. W. MAYER ET AL     2,578,719
INJECTION MOLDING APPARATUS
Filed June 14, 1944     4 Sheets-Sheet 3
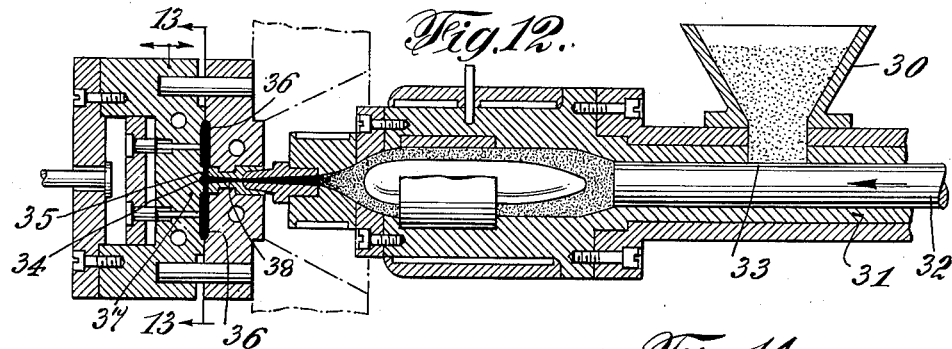
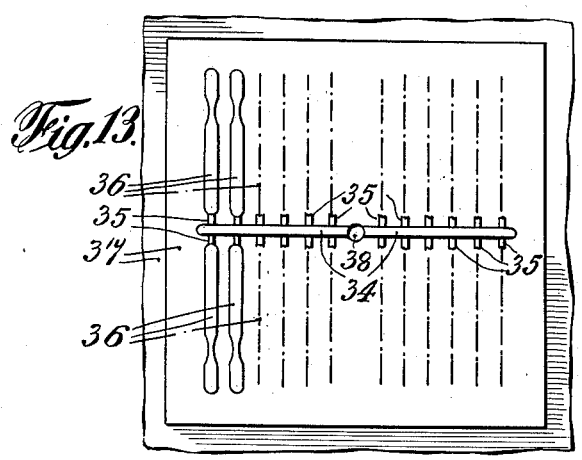
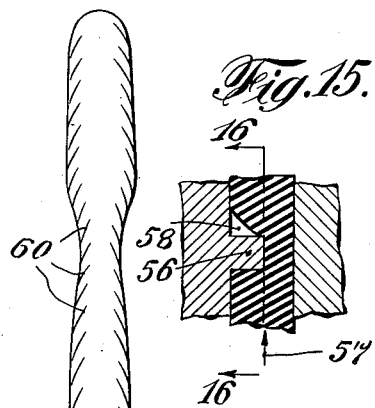
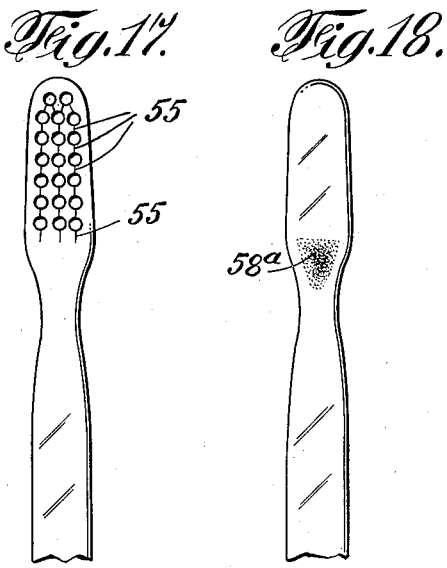
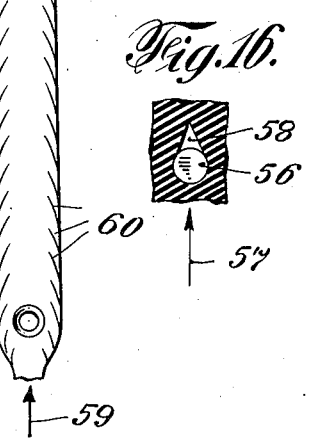
INVENTORS
Joseph W. Mayer
Wilbur F. St. Clair
BY
ATTORNEY Dec. 18, 1951 J. W. MAYER ET AL 2,578,719
INJECTION MOLDING APPARATUS
Filed June 14, 1944 4 Sheets-Sheet 4
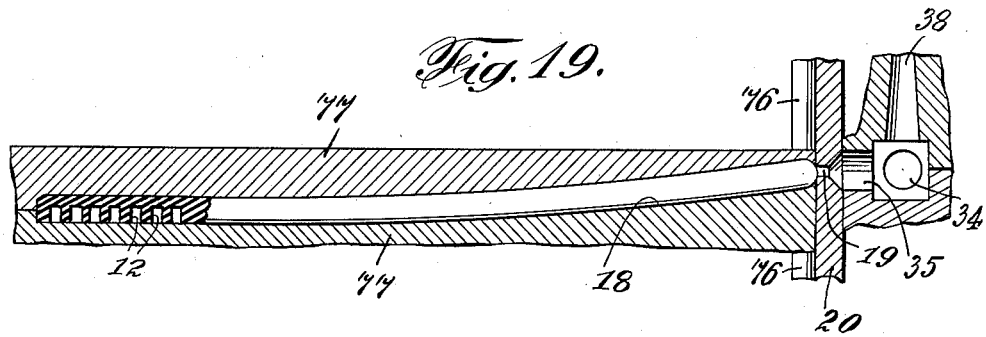
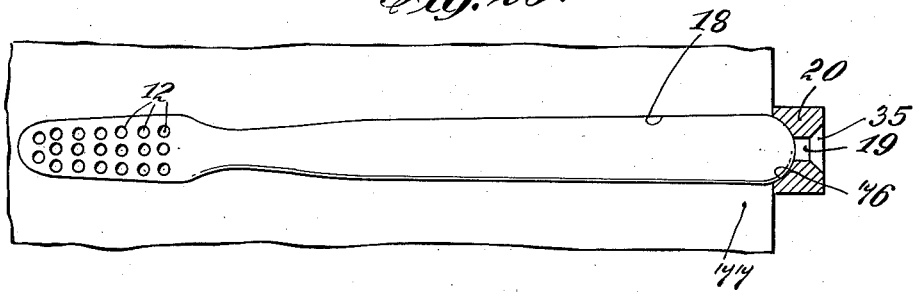
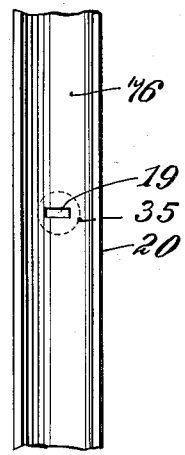 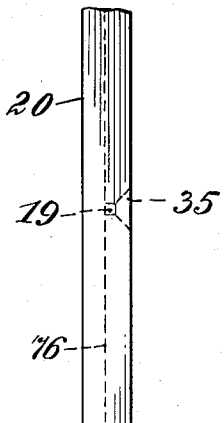
INVENTORS
Joseph W. Mayer
Wilbur F. St. Clair
BY
ATTORNEY

Patented Dec. 18, 1951

2,578,719

UNITED STATES PATENT OFFICE 2,578,719

INJECTION MOLDING APPARATUS

Joseph W. Mayer and Wilbur F. St. Clair, Troy, N. Y., assignors, by mesne assignments, to Autograf Brush & Plastics Co., Incorporated, a corporation of New York Application June 14, 1944, Serial No. 540,268

1 Claim. (Cl. 18—30)

This invention relates to the manufacture of plastic articles and has for its object to provide means to improve the same.

In such manufactures, two methods are generally used, the compression method and the injection method. The use of the injection method presents certain defects in the articles made thereby. Such injection methods employ initial pressures of 20,000 to 30,000 pounds per sq. in., but by the time the material reaches the cavities of the molds, the pressure is considerably reduced to about 2000 pounds per sq. in., chiefly because the flow of the plastic is subjected to 90° turns. Frictional losses in the heating cylinder and elsewhere also reduce the pressure. The remaining effective pressure being applied to the plastic material in the cavity through a small orifice at one end of the cavity also reduces the pressure in the cavity. In consequence, striations along the walls forming the cavities take place; elsewhere cracks or weld lines are formed, which form weak spots in the use of the articles. In the case of toothbrushes or similar articles having holes or bores, the walls of such holes are weak and they do not withstand the pressure of the bristles and their clamping or holding devices. Finally, the ducts leading to the cavities of the molds provide tits or projections on the molded articles which require grinding or cutting off and subsequent polishing.

The invention consists in an apparatus for subjecting the contents of a cavity filled by the injection method, to a compression action in order to compact the plastic material while still in a plastic state or condition.

The invention consists also in an apparatus for compacting the plastic material supplied to the cavities of the mold by the injection method, while the plastic material is still warm and plastic. More particularly, the invention consists in providing pins or the like and means for operating the same to enter the filled cavity of the mold, while the contents thereof is still soft.

The invention consists further in means for separating the duct tits or projections from the article before the molded article is taken out of the mold.

The invention will be described hereinafter in the light of its environment, embodiments thereof will be shown in the drawings, and the invention will be finally pointed out in the claim.

In the accompanying drawings,

Fig. 1 is a view part in section and part in elevation of the platens and cavity mold, of known construction, with the improvement of the compression pins added thereto, showing the cavity mold in open position;

Fig. 2 is an enlarged sectional view of Fig. 1, showing the cavity mold closed with the improved pins entering the plastic;

Fig. 3 is a detail fragmentary view of the cavity mold in open position, showing the improved pins;

Fig. 4 is a detail fragmentary view of the same parts as shown in Fig. 3, but with the cavity mold in closed position, but unfilled with plastic;

Fig. 5 is the same view but with the cavity mold filled with plastic, and prior to the entry of the pins into the plastic;

Fig. 6 is the same view, but with the pins having entered the plastic;

Fig. 7 is the same view, but with the pins withdrawn from the plastic, showing the plastic hardened around the pin zone;

Fig. 8 shows a fragmentary plan view of the plastic, showing the bore and surrounding hardened zone;

Fig. 9 is a section taken on line 9—9 of Fig. 8;

Fig. 10 is a sectional view of a cavity mold operating under both the injection and compression methods;

Fig. 11 is a front view of the plastic while in the cavity mold, one part of the cavity mold having been removed, this form being shown as typical of other configurations which may be used;

Fig. 12 is a longitudinal section of the known injection molding system combined with the improvement;

Fig. 13 is a plan view of a multiple cavity mold used in connection with the foregoing injection system, these known parts being shown explanatory of the defects of such a system when alone used;

Fig. 14 is a view of a front or back of a tooth brush handle showing striations resulting from the use of the injection method;

Fig. 15 is a fragmentary section view showing the method of providing holes in a tooth brush handle, when the injection method is used;

Fig. 16 is a plan view taken on line 16—16 of Fig. 15;

Fig. 17 is a view of the front of a tooth brush handle made by the injection system, and showing crack lines between the holes;

Fig. 18 is a view of the back of a tooth brush handle, showing a depression formed, when such handle is made by the injection method, such a depression is frequently formed on the front of the handle also;

Fig. 19 is a longitudinal section of a cavity mold for a tooth brush, to show the fit separation, usually formed at the end of the handle when using the injection method;

Fig. 20 is a plan view of the same;

Fig. 21 is a detail front view of the curved member which acts as a valve to cut off the tit, and Fig. 22 is a detail side view of the valve member shown in Fig. 21.

Similar characters of reference indicate corresponding parts throughout the various views.

Referring to the drawings, and more particularly to Figures 1 and 2, the known molding press is shown, which has a cavity 10 for the reception of the plastic material. This material is supplied by the injection method and apparatus, which is shown in Fig. 12. While the material is still soft in the cavity 10, slidable pins 11 are moved into the material and thereby pressure is applied to the material which displaces the material and thus compresses it around the bores 12 formed by the entering pins 11. The displaced material consolidates and makes more compact the material forming the walls surrounding the bores, as shown by 13 in Figs. 6, 7, 8 and 9.

This principle of operation is applied to the entire contents of the cavity by providing a wall forming the cavity, with means for moving it into the cavity. This movable wall enters the cavity and exerts a compression action upon the contents of the cavity. As the plastic material is soft and relatively fluid, this compression is exerted upon all parts of the material under the laws of fluid pressure. It is made uniformly dense and compact, and free from striations, structural stresses, folds, flow lines, bubbles, etc. as are found in many if not in all instances where the injection method alone is used. A structure embodying both the injection and compression methods for the molding of articles of plastic material is shown in Fig. 10.

Finally, a cutting off means for severing the tits or projections formed by the ducts 19 in Fig. 19 leading to the cavities 18 of the injection method, a sliding member 20, having a concave depression corresponding to the convex end part of the article being molded is provided. Upon the conclusion of the molding operation, but just before setting takes place, this mold is moved and thereby the mold is moved away from the duct which during molding communicates directly with the cavity and the fluid communication is severed. The soft tit or extension is thereby severed from the body of the article and the end of the article corresponds to the final end intended to shape the product when molded. Such a duct tit remover may be applied to all of the embodiments shown in the drawings. Heretofore such a tit or projection hardened on the article required special manipulation to remove and to polish the end of the article.

The foregoing descriptions made reference to a single cavity, but it is clear that multiple cavity molds are included, and the same results accomplished in the use of such multiple molds.

The foregoing descriptions of the invention will be clear to one skilled in the art, but to amplify the descriptions, there is shown the known form of injection molding. In Fig. 12, a hopper 30 for the base material feeds into a cylinder 31 in which a piston 32 forces the fluid material first at 90° at 33 and then again at 90° at 34, through ducts 35, into the cavities 36 of a multiple mold 37. The cavities 36 have any shape corresponding to the configuration of the article desired.

The plastic material which may be used is: acetate, methacrylate, butyrate, polystyrene or other plastics of similar kind adaptable for injection molding, which are either thermo-plastic or thermo-setting.

The apparatus shown in Figs. 1 and 2, consists of the parts as follows:

The cavity 10 is formed by parts 10a and 10b. The part 10b is on the stationary or fixed platen 40. The movable part 10a is on a movable platen 41, which is suitably operated. Cylindrical guide standards 40a guide the movable platen 41. A piston 43 is guided in the platen 41 which is shaped as a cylinder 44. Compressed air or the like enters at 42. The piston 43 is provided with recesses 46 of cylindrical shape in which guide pins 47 are guided, which pins enter cylindrical recesses 48 in the cavity mold 10a at the rear thereof. Springs 49 space the piston 43 from the cavity mold 10a. Pins 11 are normally in the position shown in Fig. 1, that is, one end of each thereof is flush with the surface of the cavity mold 10a.

To explain the action of the parts of the cavity mold, these parts are shown in Fig. 3, in open position. The part 10b is provided with the plastic inlet 50. The mold part 10a moves as shown by the arrow 51 in one or the other direction. When moved in the direction shown by the arrow 52 of Fig. 4, the cavity mold is in closed position, ready to receive the plastic. The cavity is then filled as shown in Fig. 5, and the pins 11 are flush with the surface of the part 10a. These pins 11 are then pressed inwards of the plastic by the operation of the parts as shown in Figures 1 and 2, with Fig. 2 showing the insertion into the plastic of the pins 11. This relationship is also shown in Fig. 6, and the zone around the pins is shown as compressed. The arrows 53 of Figure 6 show this compressing action. By withdrawing the pins 11, as shown by the arrows 54, the bore 12 with the surrounding compressed zone 13 remains in the plastic material. In Figures 8 and 9 these parts are shown in separate views. The shading indicated by 13 is, of course, merely symbolical, the compression may be more or less. In any event, the important point is the combination of the injection method as a result of which the plastic enters the plastic inlet 50, and the compression method around the pins and of the plastic. The crack-lines 55 between the holes, and sometimes extending beyond the holes, and sometimes formed in the neck of the handle, are thereby prevented from being formed, and the weakness resulting from the cracks is avoided. On the contrary, the front and neck of the brush are strengthened by the compression of the plastic surrounding the holes for the bristles and their fastening means. The flow of the metal around the projections of the old structure indicated by 56 in Figs. 15 and 16, the flow being indicated by the arrow 57, leaves a gap 58 in the plastic, since the fluidity of the plastic is not sufficient to quickly embrace the projection 56, and these and other factors cause a shallow depression 58a (Fig. 18) in the back of the neck of the handle, and frequently also in the front. The use of the compression pins 11 as described prevents such depression 58a and also gaps, or weakenings resulting from the belated filling of such gaps.

The entrance of the plastic from the duct 38 into the inlet 50, and then in between the parts making up the cavity mold, bring about a slight chilling of the plastic along the walls of the mold, and striations 60 are formed as shown generally in Figure 14. The flow of the plastic is shown by the arrow 59 in Figure 14. These internal stress lines bend to weaken the article when molded and effect somewhat the final characteristics thereof. It will be seen that in the known injection method as shown, the plastic material must make some 90° turns, as at 33, 34 and 35 in Figures 12 and 13, which together with the travel distance, heat conduction, reduces the temperature of the plastic material, whereby when it arrives in the cavity molds the chill of the molds acting on the plastic of reduced temperature brings about the striations shown in Fig. 14. To avoid such striations, the plastic before hardening is subjected to a compression action. Typical of such a combined action of injection and compression is shown in the embodiment of Figure 10. The injection method terminates at the inlet at 50. By ducts 61, the plastic enters the cavity molds 62, there being shown two in number. The shape of the cavities is hexagonal, but any other shape may be utilized. In Figure 11, only the configuration of the molded article is shown, but while still in the molds, so as to indicate the feed inlet connections. In Figure 10, the cavity mold part 10b is secured to the platen 40. The other cavity mold 10c has a bore, in which a piston 66 moves. The piston has a spaced shoulder 67, and a spring 68 is disposed between the shoulder 67, and the part 10c. Motive power fluid enters at 69, and presses the piston 66, compressing the springs 67, and the face 70 of the piston which acts with the part 10c to form the cavity mold, presses plastic in all directions, and thus compresses the mass of the plastic in the mold. Any striations, shallows, cracks, etc. which usually result from the use of the injection method, are prevented from being formed, and a very compact molded article is obtained. The pins 11 may be combined with the piston 66, to further strengthen the walls of the bores.

This combined method of Figure 10, provides very compact and brilliant surfaced articles.

In certain articles and particularly tooth brush handles, the inlet 19 is filled with plastic after the cavity mold has also been filled, and the material in the inlet, then forms a projection or tit on the end of the handle or other article. This tit must be removed and the end of the handle polished, in order to make it marketable. To prevent the formation of such a tit, the end of the mold is separated from the inlet 19, and the inlet arranged in a separate member 20, which has a curved portion 76 completing the end of the contour of the mold 77. When the mold 77 has been filled and the curved portion 76 also filled, and sufficient time has elapsed for hardening or almost hardening, then either the mold 77 is moved in respect to the valve member 20, or the latter is moved in respect to the former. In either event, the tit or material in the inlet 19 is severed from the article in the mold, and the end of the article is initially smooth, without requiring any grinding off. The mold 77 has been shown only to show its relationship with the cut off part 20, but it is clear, the embodiment shown may be modified by providing one of the mold cavity parts with pins to compress the bristle bore walls, and also with a compressing piston to compress the entire article after having been molded by the injection method. The lower part of the mold shown in plan view in Figure 19, would be modified according to the teachings of Figures 2 and 10.

We have described several forms of our invention, but obviously various changes may be made in the details disclosed without departing from the spirit of the invention as set out in the following claim.

What we claim is:

In a cavity mold for molding articles of plastic, the combination of a first platen, a second platen movable against the first platen and having a guide hole, part of the front surfaces of said platens contacting and part spaced from each other to form a cavity mold, an injection nozzle for the first platen for discharging plastic into said cavity to fill the same, a piston spaced from the rear surface of the second platen, a compression molding member carried by said piston extending through said guide hole of the second platen, and having its end flush with the cavity surface of the second platen, means moving said piston toward the second platen while said platens are in contact for moving the compression molding member into the plastic in the cavity, for subjecting the plastic molded in the cavity by the injection nozzle, to fluid pressure to the extent of the displacement of the inserted compression molding member into the plastic in the mold cavity and forming a consolidated portion around the compression molding member.

JOSEPH W. MAYER.
WILBUR F. ST. CLAIR.

REFERENCES CITED

The following references are of record in the file of this patent:

UNITED STATES PATENTS

| Number | Name | Date |
| --- | --- | --- |
| 1,174,049 | Brand et al. | Mar. 7, 1916 |
| 1,673,054 | Rosenberger | June 12, 1928 |
| 1,989,812 | Lester | Feb. 5, 1935 |
| 2,181,157 | Smith | Nov. 28, 1939 |
| 2,207,600 | Seaver | July 9, 1940 |
| 2,253,822 | Sundback | Aug. 26, 1941 |
| 2,282,308 | Dahlin | May 12, 1942 |
| 2,353,825 | Hofmann | July 18, 1944 |
| 2,355,613 | Wacker | Aug. 15, 1944 |

FOREIGN PATENTS

| Number | Country | Date |
| --- | --- | --- |
| 357,992 | Great Britain | Sept. 24, 1931 |